Aug. 20, 1935.  A. S. RUFSVOLD  2,011,653
CONTROL SYSTEM
Filed Jan. 7, 1932  3 Sheets-Sheet 1

WITNESSES
E. A. McCloskey
George V. Woodling

INVENTOR
Arnold S. Rufsvold
BY W. R. Coley
ATTORNEY

Aug. 20, 1935.  A. S. RUFSVOLD  2,011,653
CONTROL SYSTEM
Filed Jan. 7, 1932  3 Sheets-Sheet 3

WITNESSES:

INVENTOR
Arnold S. Rufsvold
BY
ATTORNEY

Patented Aug. 20, 1935

2,011,653

UNITED STATES PATENT OFFICE 2,011,653

CONTROL SYSTEM

Arnold S. Rufsvold, Pittsburgh, Pa., assignor to Westinghouse Electric & Manufacturing Company, a corporation of Pennsylvania Application January 7, 1932, Serial No. 585,291

19 Claims. (Cl. 242—75)

My invention relates, in general, to control systems and particularly to control systems that may be utilized with rubber mill machinery, such, for example, as calenders and the like.

In the manufacture of rubber material, it is necessary in certain cases to wind a strip of rubber on a reel as it is withdrawn from a calender while subjecting the rubber material to but very little, if any, tension. In view of the fact that the rubber material cannot be subjected to tension, I provide for winding the rubber upon the reel with a slack-loop or a sag between the calender and the reel. Furthermore, as the material is being wound upon the reel, the diameter of the reel gradually increases, thus making it necessary to correspondingly decrease the speed of the reel in order to maintain the sag of the slack-loop substantially the same during the entire winding operation.

An object of my invention is to provide for transferring material from a delivering means to a receiving means with a slack-loop and for so regulating the speed of the receiving means relative to the delivering means that the sag of the slack-loop remains substantially the same at all time.

Another object of my invention is to provide for so cooperatively operating a delivering and a receiving means that the tension of the material which passes from the former to the latter is reduced to a minimum at all times and for any operating condition.

A further object of my invention is to provide for operating the speed of a receiving means in accordance with the rate of speed at which material may be delivered to said means.

Also an object of my invention is to provide for transferring material from a delivering means to a receiving means with a slack-loop and for utilizing said slack-loop for regulating the speed of the receiving means.

It is also an object of my invention to provide for regulating the speed of a receiving means in accordance with the status of a slack-loop of the material as it is being received by the same means.

It is likewise an object of my invention to provide a control system of the class indicated, that shall be simple and reliable in operation and be readily and economically manufactured and installed.

Other objects will hereinafter become apparent. For a full understanding of the nature and the objects of my invention, reference may be had to the accompanying drawings, which illustrate a preferred embodiment of my invention, taken in connection with the following detailed description, in which.

Figure 1:
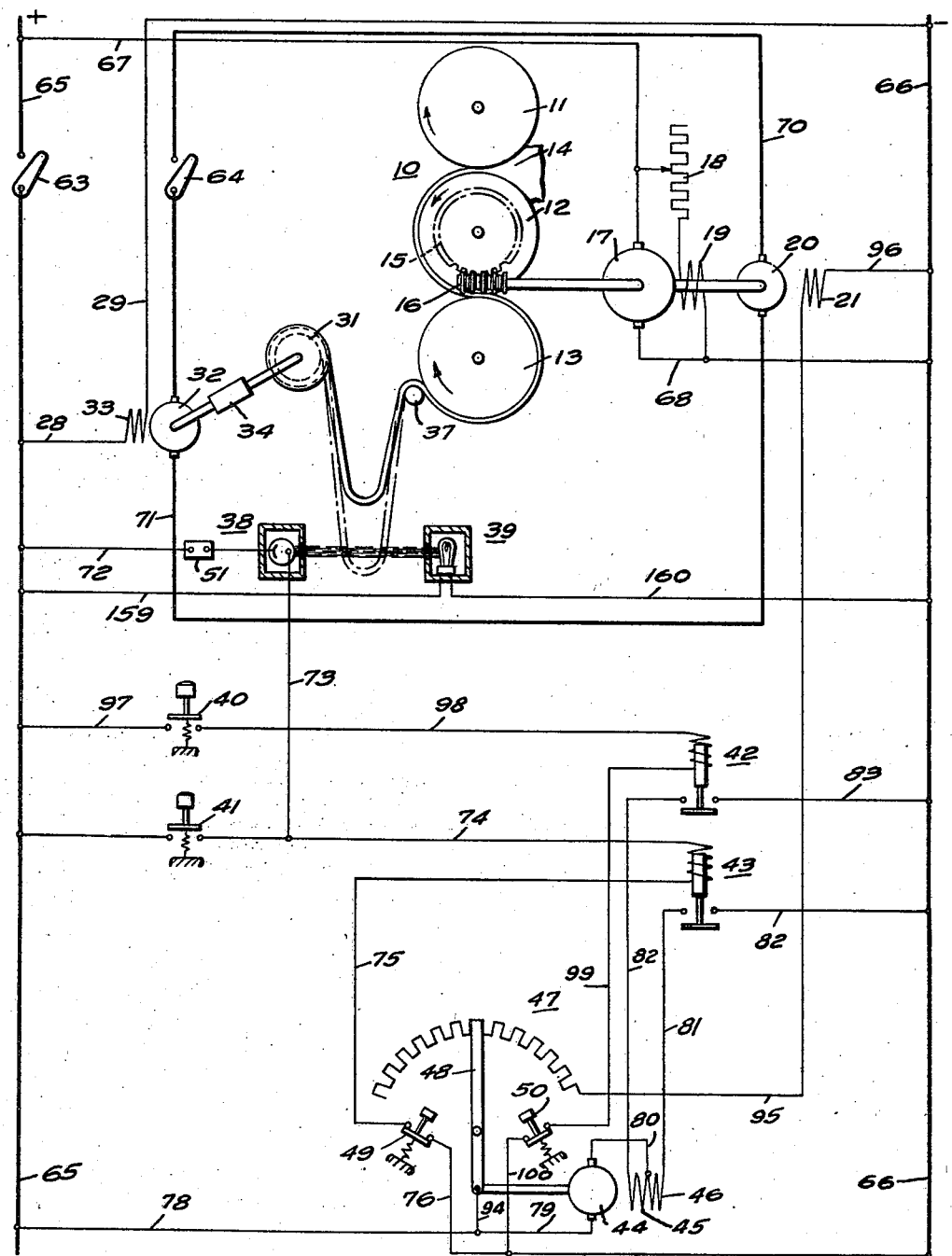
Figure 1 is a diagram of a control system shown in connection with a calender, and embodying the features of my invention.

The control system in Fig. 1 comprises, generally, a calender 10, a generator 20, a motor 17 disposed to drive the calender 10 and the generator 20, a rotatable reel 31 driven by a motor 32 through a suitable speed reducer 34, a photo-glow tube 38 that is responsive to a light source 39, and a variable rheostat 47 for the generator 20 actuated by a motor 44 and controlled by the relays 42 and 43.

The calender 10 comprises three revoluble rolls 11, 12 and 13 disposed in substantial vertical alignment so as to work a supply of rubber 14 into a flat sheet of the desired width and thickness. The rubber sheet, upon leaving the calender rolls, is disposed to ride over a rotatably mounted roll 37 and thence with a slack-loop to the rotatable reel 31.

As is usual practice in constructing calenders, the centrally disposed roll 12 is driven at a relatively low speed by a motor 17 though a suitable gear reduction comprising a worm wheel 15 and a worm 16. Inasmuch as the operating conditions of a calender call for an approximate speed range of 4 to 1 an adjustable rheostat 18 is connected in circuit with the shunt field 19 of the motor 17 for the purpose of providing said speed range.

Because of the 4 to 1 speed range of the motor 17, together with the fact that the diameter of the rotatable roll 31, in general, varies from approximately 6" to 30" from an empty roll to a full roll the speed range of the motor 32 must be approximately 20 to 1. In view of this relatively large speed range, I provide for controlling the speed of the motor 32 by varying the armature voltage instead of the field current. Preferably, as illustrated, the armature of the motor 32 is connected in closed circuit with the armature of the generator 20 that is driven by the motor 17. In this manner the speed of the motor 32 is controlled directly by the armature voltage of the generator 20, which is a function of the speed at which the said generator is driven by the motor 17, and the field strength of the winding 21.

Generally speaking, since the speed of the generator varies in accordance with the speed at which the calender is driven, the variations in the field strength of the winding 21 need be only sufficient to compensate for the increase in the diameter of the rotatable roll 31. That is to say, a speed variation of 4 to 1 for the motor 17, together with a variation of field strength approximately 5 to 1, produces an output voltage range of the generator 20 approximately 20 to 1, thus effecting a speed range of approximately 20 to 1 for the motor 32 that drives the rotatable reel 31.

As illustrated, the field strength of the generator 20 is varied by means of the rheostat 47 actuated by the motor 44 that is controlled by the photo-glow tube 38 and the associated relay 43.

As the diameter of the roll 31 increases, it is manifested that the speed of the driving motor 32 must, correspondingly, be decreased in order to maintain substantially the same sag of the slack-loop between the calender roll 37 and the reel 31. Accordingly, when the slack-loop rises a certain amount as a result of the increase in the diameter of the reel 31, the light source 39 illuminates the photo-glow tube 38, which causes it to function to pass sufficient current to operate the relay 43. The relay 43, when closed, energizes the split field winding 46 of the motor 44 in such direction that the motor actuates the rheostat arm 48 to the left to reduce the field strength of the winding 21 of the generator 20. The limit switches 49 and 50 associated with variable resistor 47 and normally biased closed by the illustrated springs, serve to deenergize the motor 44 when the arm 48 reaches the end of its travel, in either direction.

A photo-glow tube is similar to a gas filled photo-electric cell, except that the gas pressure is considerably higher. The operation of the photo-glow tube is substantially like the operation of a very sensitive relay. In other words, when under the influence of a light source, the said tube functions to pass current between the illustrated electrodes, representing the closed position of a relay, and when not under the influence of a light source, the tube functions to pass no current, representing an open circuit condition of a relay. As illustrated, the photo-glow tube 38 is connected in circuit with the winding of the relay 43 and when operated at sufficient voltage, together with a suitable light source, the electron glow resulting from the photo-electric effect is sufficient to ionize the gas and initiate a glow discharge between the illustrated electrodes thereof.

The glow discharge of a photo-glow tube is sufficient to operate sturdy relays, since several milliamperes may flow therethrough.

It will be noted that when a glow discharge is established, means must be provided for extinguishing the said discharge when the slack-loop intercepts the light source.

In other words, if the illumination is increased above the break-down point and then decreased, no amount of reduction in illumination will cause the glow to cease. That is to say, for the glow discharge to cease, the voltage to which the tube is subjected must be reduced below the fixed direct current break-down voltage. For the purpose of reducing the voltage below this voltage, I employ a vibrating interrupter 51 which may be of any conventional type connected in series circuit relation with the photo-glow tube.

In this manner when the light source radiating from the light 39 is intercepted by the slack-loop of the rubber strip, and when the pulsating uni-directional current decreases to substantially zero, the glow discharge ceases immediately.

In explaining the operation of the control system, let it be assumed that the positive supply conductor 65 and the negative supply conductor 66 are energized, that the manually operated switches 63 and 64 are closed, and that the slack-loop of the rubber strip is intercepting the light source 39. Under this assumed condition, the motor 17 that drives the calender 10 and the generator 20 is energized by a circuit that extends from the positive supply conductor 65 through conductor 67, the motor 17, and conductor 68 to the negative supply conductor 66.

At the same time, the shunt field winding 19 is energized through the variable resistor 18, which may be adjusted to accommodate any desirable speed condition of the calender 10. Just as soon as the motor 17 begins to run, the generator 20 provides power for operating the reel motor 32. The armature of the generator 20 is connected in closed circuit with the armature of the reel motor 32 through a conductor 70, a manually operable switch 64 and a return conductor 71.

The field 33 of the motor 32 is connected directly across the supply conductors 65 and 66 by conductors 28 and 29, and accordingly the speed of the motor 32 is controlled directly by the output voltage of the generator 20. The light source 39 is connected directly across the supply conductors through conductors 159 and 160.

For the purpose of varying the field strength of the generator 20, a motor operated rheostat 47 is connected in series circuit relation therewith. This circuit may be traced from the positive supply conductor 65 through conductors 78 and 94, the arm 48 of the rheostat, the resisting units of the rheostat 47, conductor 95, the field winding 21 and conductor 96 to the negative supply conductor 66. In this particular embodiment of the invention, it will be observed that in order to maintain substantially the same sag in the slack-loop, the field strength of the winding 21 must be decreased substantially in the same proportion as the diameter of the rotatable reel 31 increases.

In order to accomplish this feature, it will be observed that even though the speed of the rotatable reel 31 is constant, the gradually increasing diameter of the reel 31 raises the slack-loop and permits the light source 39 to excite the photo-glow tube 38. When a glow discharge is initiated in the photo-glow tube 38, it passes current for energizing the winding of the relay 43. This circuit may be traced from the positive conductor 65 through conductor 72, the vibrating interrupter 51, the photo-glow tube 38, conductors 73 and 74, the winding of the relay 43, conductor 75, the limit switch 49, and conductors 76 and 77 to the negative supply conductor 66.

The relay 43, when operated, establishes a circuit for energizing the motor 44. This circuit may be traced from the positive supply conductor 65 through conductors 78 and 79, the armature of the motor 44, conductor 80, the split field winding 46, conductor 81, the contacts of the relay 43, and conductor 82 to the negative supply conductor 66. Just as soon as the above-traced circuit is established, the motor 44 actuates the rheostat arm 48 to the left. Accordingly, as the rheostat arm 48 moves to the left more resistance is connected in circuit with the field winding 21 to reduce the output voltage of the generator 20, with the result that the speed of the motor 32 is correspondingly decreased.

The motor 44 continues to operate the arm 48 to the left until the speed of the reel motor 32 has been decreased sufficiently to cause the slack-loop to intercept the light source 39. At this instant, the glow discharge of the photo-glow tube is extinguished, resulting in the deenergization of the relay 43 which, when open, interrupts the circuit for energizing the motor 44. However, in a relatively short period of time, the slack-loop again rises, since the diameter of the reel 31 is ever increasing, and permits light to fall upon the photo-glow tube 38, which, in cooperation with the relay 43 and the motor-operated resistor 47, as hereinbefore explained, decreases the field strength of the winding 21. This cycle of operation is repeated continually from the time that the reel is empty until it is full. However, I find in some cases, that it is desirable to allow the operator to regulate the speed of the reel 31 independently of the speed control effected by the photo-glow tube 38.

For this purpose, I provide for reversing the polarity of the field flux of the motor 44 by means of the relays 42 and 43, together with their associated push-button switches 40 and 41. Therefore, when the operator desires to decrease the speed of the reel motor 32, independently of the functioning of the photo-glow tube, he merely depresses the push-button 41 that is normally biased to open position by the illustrated spring. This completes a circuit for energizing the relay 43, which, when operated, together with the motor operated rheostat 47 decreases the speed of the reel motor 32, as hereinbefore explained.

On the other hand, if the operator desires to increase the speed of the reel motor 32, he merely depresses the push-button 40 that is normally biased to open position by the illustrated spring. This establishes a circuit for energizing the relay 42, which, when operated, connects the field winding 45 with the motor 44. The circuit for energizing the relay 42 may be traced from the positive supply conductor 65 through conductor 97, push-button 40, conductor 98, the winding of the relay 42, conductor 99, the limit switch 50, and conductors 100 and 77 to the negative supply conductor 66.

When the relay 42 is closed, the current for operating the motor 44 flows from the positive conductor 65 through conductors 78 and 79, the armature of the motor 44, the split field winding 45, conductor 82, the contacts of relay 42, and conductor 83 to the negative supply conductor 66. Under this condition, since the field current traverses the winding 45 instead of the winding 46, the motor 44 operates in the direction to actuate the rheostat arm 48 to the right. In consequence, the field strength of the winding 21 is increased, which in turn causes the generator 20 to generate more voltage for increasing the speed of the motor 32.

It is apparent that as long as the push-button 40 is depressed, the motor 44 continues to operate in the direction to gradually exclude the resistor units of the rheostat 47 from the circuit of field winding 21. However, it will be observed that the circuit which energizes the motor 44 is interrupted when the rheostat 48 is actuated to the extreme right, or to the extreme left. This arrangement is in accordance with the usual practice in constructing motor-operated rheostats for the purpose of stopping the motor when the rheostat arm reaches the limit of its travel in either direction.

Therefore, the control system shown in Figure 1 provides for transferring material from a delivering means to a receiving means with a slack-loop and for so regulating the speed of the receiving means relative to the speed of the delivering means that the amplitude of the slack-loop is substantially the same throughout the operating period.

Figure 2:
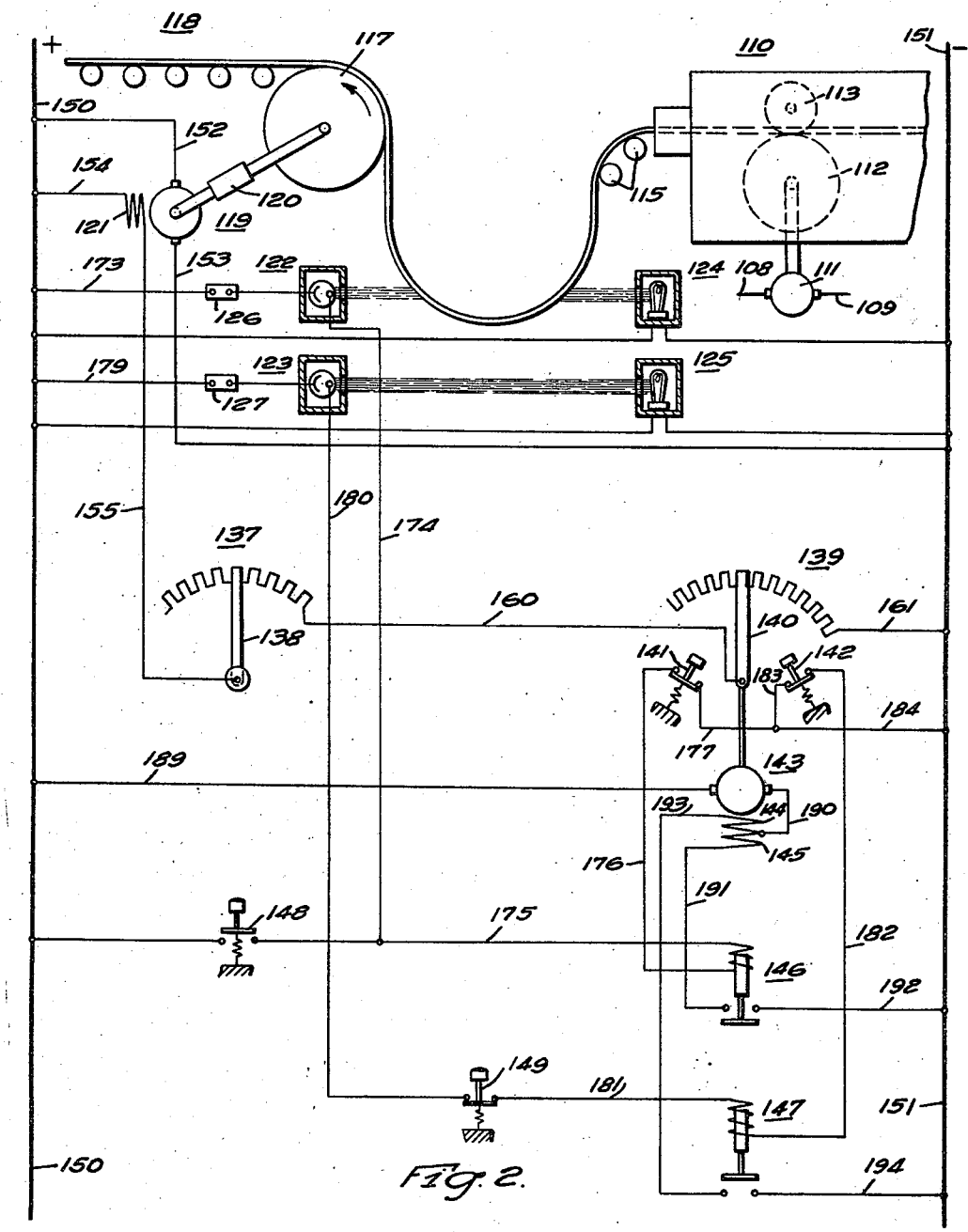
Fig. 2 is a diagram of a control system shown in connection with a conveyor, and embodying the features of my invention.

The control system of Figure 2, is shown in connection with a conveyor 118 and a delivering means 110. However, in this embodiment of the invention the motor 111 that drives the delivering means 110 is operated independently of the motor 119 that operates the conveyor 118. Generally, the control circuit in Fig. 2 comprises a delivering means 110 driven by the motor 111, a conveyor 118 driven by a motor 119, two photo-glow tubes 122 and 123 with their associated light sources 124 and 125, two relays 146 and 147 responsive to the photo-glow tubes, a motor operated rheostat 139, and a manually operated rheostat 137.

The delivering means 110 is shown somewhat diagrammatically, since it may take the form of many different types of machines to which my invention may be readily applied. As diagrammatically shown, the delivering means includes two cooperatively disposed rollers 112 and 113 driven by the motor 111. The material, after it passes between the rollers, is ejected from the delivering means over the rollers 115 so as to relieve the material of an undue strain.

Preferably, as illustrated, the motor 111 may be energized from any suitable source other than the supply conductors 150 and 151 such as the supply conductors 108 and 109. The delivering means 110 is so disposed relative to the conveyor means 118 that the material is free to sag and form a slack-loop as it passes from the former to the latter.

The conveyor means 118 is, likewise, shown somewhat diagrammatically, because there are many types of conveyors to which my invention may be readily applied. As illustrated, the conveyor 118 comprises a plurality of rollers over which the material passes after leaving the rotatable driving roll 117 that is driven by the motor 119 through a gear reduction 120 of any suitable type.

In this embodiment of the invention, the purpose of the control system is to so regulate the speed of the conveyor motor 119 that the slack-loop is maintained substantially the same throughout the operating period.

In view of the fact that in usual practice the speed range of the delivering means 110 is not more than 4 to 1 together with the fact that the diameter of the driving roll 117 is constant, unlike the rotatable reel of ever-increasing diameter, speed control may be effected by varying the field strength of the field winding 121 of the motor 119. This is accomplished by means of the motor-operated rheostat 139, together with the manually-operated rheostat 137. The construction and operation of the motor-operated rheostat 139 is the same as that previously described for the motor-operated rheostat 47 shown in Figure 1. Likewise the photo-glow tubes 122 and 123 respond to their associated light sources 124 and 125 in the same manner as the photo-glow tube 38 shown in Fig. 1 responds to its light source 39.

In explaining the operation of the control circuit shown in Figure 2, let it be assumed that the motor 111, which drives the delivering means 110, is energized by the supply conductors 108 and 109. When the supply conductors 150 and 151 are energized, the armature of the motor 119 is connected directly across the supply source through a circuit extending from the positive supply conductor 150 through conductor 152, the armature of the motor 119, and conductor 153 to the negative supply conductor 151. The circuit for energizing the field winding of the motor 119 may be traced from the positive supply conductor 150 through conductor 154, the field winding 121, conductor 155, the manually-operated rheostat 137, conductor 160, the motor-operated rheostat 139, and conductor 161 to the negative supply conductor 151.

With the slack-loop in the stabilized position as illustrated in the drawings, the photo-glow tube 122 is passing no current while the tube 123 is passing current to energize the relay 147. The current that energizes the relay 147 flows from the positive supply conductor 150 through conductor 179, the current interrupter 127, the photo-glow tube 123, conductor 180, the push-button 149, conductor 181, the winding of the relay 147, conductor 182, the limit switch 142, and conductors 183 and 184 to the negative supply conductor 151. When the contacts of the relays 146 and 147 are open, the motor 143 that operates the rheostat 139 is deenergized. This stabilized condition may exist for a relatively long period of time, if the relative speed of the delivering means and conveyor remains unchanged. However, for the purpose of explaining the operation, I will assume that the speed of the delivering means is somewhat decreased, in which case the slack-loop gradually rises and permits light from the light source 124 to illuminate the photo-glow tube 122. A glow discharge is immediately established, which passes current for energizing the relay 146.

The circuit through the photo-glow tube 122 may be traced from the positive supply conductor 150 through conductor 173, a vibrating interrupter 126, the photo-glow tube 122, conductors 174 and 175, the winding of the relay 146, conductor 176, the limit switch 141 and conductors 177 and 184 to the negative supply conductors 151. The contacts of the relay 146, when closed, establish a circuit for operating the motor 143. This circuit extends from the positive supply conductor 150 through conductor 189, the armature of the motor 143, conductor 190, the split field winding 145, conductor 191, the contacts of the relay 146 and conductor 192 to the negative conductor 151.

Under this condition, the motor 143 actuates the rheostat arm 140 to the right, which increases the field strength of the motor 119 for reducing its speed. The motor 143 continues to actuate the rheostat arm 140 to the right until the speed of the conveyor motor 119 has decreased sufficiently to cause the slack-loop to intercept the light source 124, whereupon the glow discharge of photo-glow tube 122 ceases. At this point stable operation between the delivering means and the conveyor means is established and the motor 119 will continue to operate at this speed unless the speed of the delivery means changes.

Assuming that the speed of the delivering means increases the sag of the slack-loop of the material increases and intercepts the light source 125. The absence of light upon the photo-glow tube 123 extinguishes the glow discharge and interrupts the circuit that energizes the relay 147.

The contacts of the relay 147, when closed, complete a circuit for operating the rheostat motor 143 in the reverse direction to increase the speed of the conveyor 118. This circuit may be traced from the positive supply conductor 150, through conductor 189, the armature of the motor 143, conductor 190, the split field winding 144, conductor 193, the contacts of relay 147, and conductor 194 to the negative supply conductor 151.

In this case, since the field current traverses the split field winding 144 instead of the split field winding 145, the motor 143 operates in reverse direction to actuate the rheostat arm 140 to the left. As the rheostat arm is actuated to the left, the field strength of the winding 121 is gradually decreased to cause the speed of the motor 119 to correspondingly increase. When the speed of the motor 119 increases sufficiently to raise the slack-loop above the level of the light source 125, the photo-glow tube 123 establishes a glow discharge for energizing the relay 147, which interrupts the circuit for operating the motor 143. At this point, if the speed of the conveyor 118 and the delivering means 110 remains the same, stable operation is again resumed, and it will continue to persist as long as the slack-loop is maintained between the level of the two light sources 124 and 125

In addition to the motor-operated rheostat, I employ a manually-operated rheostat 137 for further adjusting the field strength of the motor 119. However, it is only necessary to operate the rheostat 137 when it is desirable to regulate the speed independently of the photo-glow tubes, and when the range of the motor-operated rheostat 139 is insufficient to control properly the field strength of the motor 119. Likewise, I employ two push-buttons 148 and 149 for obtaining speed control independently of the functioning of the photo-glow tubes 122 and 123.

By depressing the push-button 148, a circuit is completed for energizing the relay 146 in the same manner as if the photo-glow tube 122 were passing current. The contacts of the relay 146, when closed, cause the motor-operated rheostat 139 to function the same as previously described relative to the photo-glow tube 122.

By depressing the push-button 149, the circuit that energizes the relay 147 is interrupted and, when the contacts thereof are closed, a circuit is established for causing the motor 143 to operate the same as it would if the photo-glow tube 123 were passing no current. By means of the push-buttons 148 and 149, the operator may control the speed of the conveyor 118 at will for the purpose of accommodating any desired operating condition.

Therefore, the control circuits shown in Fig. 2 provide for regulating the speed of a receiving means in accordance with the rate of speed at which material may be delivered thereto.

Figure 3:
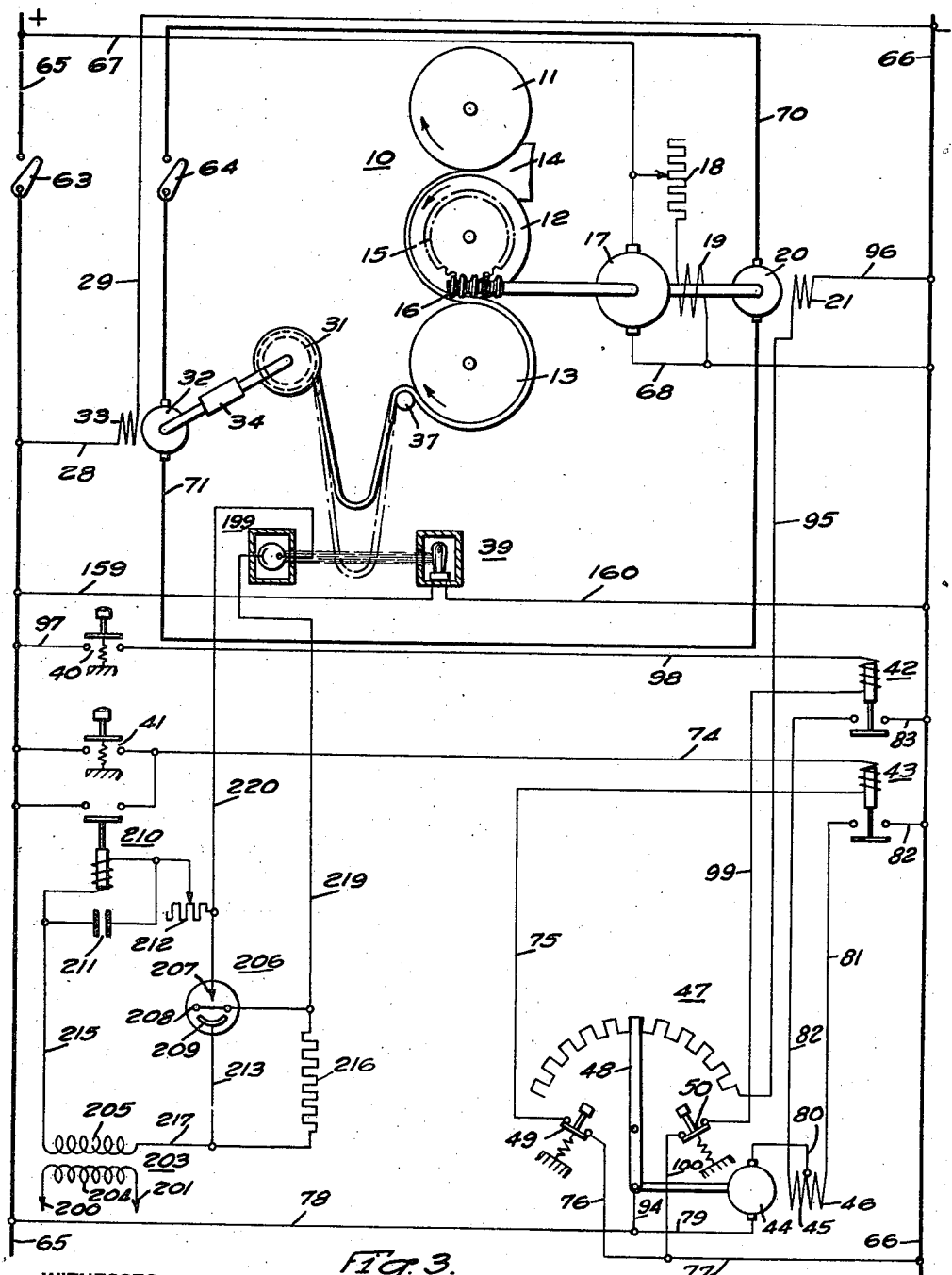
Fig. 3 is a modified form of my control system shown in Fig. 1, and illustrating a grid-glow tube associated with a photo-electric cell for the purpose of amplifying the control current.

The control circuit shown in Fig. 3 is a modified form of the control circuit shown in Fig. 1 and like parts are represented by the same reference characters. In the control circuit in Fig. 3, a photo-electric cell 199, connected in circuit with a grid-glow tube 206 and a relay 210 replace the photo-glow tube 38, shown in Fig. 1.

The operation of the photo-electric cell 199 is dissimilar to the operation of the photo-glow tube, in that the resistance which it offers to the flow of current varies substantially directly proportionally to the amount of illumination falling upon the said cell. When there is no light falling upon the photo-electric cell, its resistance is extremely high and consequently, it passes practically no current. When the photo-electric cell is illuminated, as a result of a higher position of the slack-loop, the resistance is sufficiently reduced to operate the grid-glow tube 206, which is able to pass sufficient current for operating sturdy relays for industrial purposes.

In view of the fact that the photo-electric cells in their present stage of development are unable to pass sufficient current for operating sturdy relays without considerable expense, I employ the said grid-glow tube. However, it is to be understood that when a photo-electric cell is developed to pass sufficient current to operate relays economically, I may utilize it to operate the relay 43 directly.

The grid-glow tube 206 comprises an anode 207 and a cathode 209 which are generally called the principal electrodes, and a grid 208 associated therewith. In this connection, the grid of a grid-glow tube is effective only in preventing or initiating a glow-discharge, but cannot be made to extinguish or control the discharge after it is started, whereas the grid in a conventional thermionic tube at all times maintains control over the current passing between the anode and the cathode. For this reason, since the grid-glow tube functions substantially as a very sensitive relay, I have preferably employed a grid-glow tube instead of a thermionic tube. However, I do not intend to limit my control system to a grid-glow tube, since a thermionic tube may be utilized instead.

As illustrated, one terminal of the photo-electric cell 199 is connected to the anode 207 through a conductor 220 and the other terminal of the photo-electric cell is connected to the grid 208 through a conductor 219. A resistor 216 is connected between the grid 208 and the cathode 209. The resistor 216, together with the photo-electric cell 199, constitute a potentiometer for biasing the grid voltage near that of the anode when the photo-electric cell 199 is illuminated by the light source 39, as a result of a higher position of the slack-loop.

I have preferably illustrated the grid-glow tube 206 in association with a circuit energized by alternating current, supplied by the transformer 203, instead of showing it as being utilized with direct current, for the simple reason that when the alternating current passes through zero, provided, however, at the same time, that the photo-electric cell is not illuminated, the glow discharge of a grid-glow tube is extinguished. Direct current may be utilized if a vibrating interrupter is inserted in the circuit for producing a pulsating current which causes the glow discharge to become extinct when no light is falling upon the photo-electric cell 199.

As illustrated, one terminal of the secondary winding 205 of the transformer 203, through conductors 217 and 213, is connected to the cathode 209, and the other terminal of the secondary winding, through conductor 215, the winding of the relay 210, a variable resistor 212, is connected to the anode 207. Therefore, when a glow discharge is established between the principal electrodes 207 and 209 of the grid-glow tube 206, a circuit is completed for energizing the relay 210, which, when closed, operates the relay 43. In the usual construction of a grid-glow tube, the anode is centrally and vertically disposed within the tube and is small compared to the surrounding disposed cylindrical cathode, and, accordingly, the grid-glow tube acts as a rectifier as the result of the point-to-plane principle.

In general, it may be said that the current passing through the tube is proportional to the area of the negative electrode. That is to say, when the outer cylinder is negative, a large current flows, and when the small centrally disposed electrode is negative, very little current passes. Therefore, I employ a capacitor 211 in parallel with the winding of the relay 210 for the purpose of making the flow of the unidirectional current through the winding of the relay 210 as continuous as possible.

In explaining the operation of the photo-electric cell and the grid-glow tube, let it be assumed that the primary winding 204 of the transformer is energized from a suitable source of alternating current such as the conductors 200 and 201, and that the position of the slack-loop is such as to intercept the light source 39. Under this condition, the resistance of the photo-electric cell 199 is extremely high and, in consequence, the grid potential relative to the cathode potential, between which electrodes the discharge always begins, is insufficient to initiate a discharge. The tube, when in this condition, passes no current between the principal electrodes, with the result that the relay 210 is deenergized. Therefore, the circuit that energizes the relay 43 is interrupted, and the speed of the motor 32 remains the same.

Assuming that, as a result of the increased diameter of the rotatable roll 31, the slack-loop rises and permits the light source 39 to illuminate the photo-electric cell. This illumination will materially decrease the resistance of the photo-electric cell and shift the grid potential more and more towards that of the anode, until the critical grid-to-cathode voltage is reached, at which time a threshold discharge is initiated between the grid 208 and the cathode 209.

The cathode-to-grid threshold discharge is self-supporting, and since sufficient voltage exists between the anode and the grid, the discharge is transferred to the anode and a complete continuous discharge is effected between principal electrodes 207 and 209.

The grid-glow tube, under this condition, passes current which energizes the relay 210. The discharge between the principal electrodes continues to persist as long as the photo-electric cell 199 is illuminated. The relay 210, when energized, establishes a circuit for energizing the relay 43, which controls the speed of the motor 32, as previously explained in connection with Figure 1.

However, as the speed is reduced, the sag of the slack-loop increases to intercept the light falling upon the photo-electric cell. As a result, the resistance of the photo-electric cell again assumes an extremely high value, and the grid potential relative to the cathode is decreased sufficiently that, when the alternating current passes through zero, the glow is extinguished.

Therefore, the control circuit in Fig. 3 provides for operating the speed of a receiving means in accordance with the rate of speed at which material may be delivered to said means by utilizing a photo-electric cell and a grid-glow tube. In this connection, it is readily apparent that the combination of a photo-electric cell and a grid-glow tube, may replace the photo-glow tubes 122 and 123 shown in Fig. 2. However, I have deemed it unnecessary to make a showing thereof because the functioning of the said photo-electric cell and the grid-glow tube would be the same as that explained in Figure 3.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A control system comprising, in combination, means for delivering material, constant speed driving means therefor, means for receiving said material, means for causing the said material to have more than one direction of travel as it passes from the former to the latter means, variable speed driving means for driving said receiving means at substantially the speed of said constant speed driving means, and means including a photo-electric cell that is responsive to the position of said material for varying the speed of said variable speed driving means.

2. A control system comprising, in combination, means for delivering material, means for receiving said material, the relative positions of said delivering and said receiving means being such that the material is free to sag as it passes from the former to the latter, and means including a radiation responsive device for substantially maintaining the sag at a predetermined value.

3. A control system comprising, in combination, means for delivering material, rotating means for receiving the said material, the relative positions of said delivering and said rotating means being such that the material is free to sag as it passes from the former to the latter, driving means for said rotating means, and means including a radiation responsive device for gradually reducing the speed of the said driving means as the diameter of the rotating means increases with the accumulation of material thereon.

4. A control system comprising, in combination, means for delivering material, means for receiving said material, the relative positions of said delivering and said receiving means being such that the material is free to sag as it passes from the former to the latter, driving means for said receiving means, means including a radiation responsive device for decreasing the speed of the driving means when the sag is less than a predetermined value, and means including a second radiation responsive device for increasing the speed of the driving means when the sag is more than a predetermined value.

5. A control system comprising, in combination, means for delivering material, means for receiving said material, the relative positions of said delivering and said receiving means being such that the material is free to sag as it passes from the former to the latter, and means including a plurality of radiation responsive devices for maintaining the sag between an upper and a lower limit.

6. A control system comprising, in combination, means for delivering material, means for receiving material, the relative positions of said delivering and said receiving means being such that the material is free to sag as it passes from the former to the latter, a generator having an armature and a field winding, a motor for driving the said delivering means and the said generator, a motor having an armature for driving the receiving means connected in closed circuit relation with the armature of said generator, and means including a radiation responsive device the energization of which is controlled by the sag of the material as it passes from the delivering means to the receiving means for varying the effectiveness of the field winding of said generator.

7. A control system comprising, in combination, means for delivering material, means for receiving said material, the relative position of said delivering and said receiving means being such as to provide a slack-loop in the material as it passes from the former to the latter, a generator having an armature and a field winding, a motor for driving the said delivering means and the said generator, a motor having an armature for driving the receiving means connected in closed circuit relation with the armature of said generator, means for varying the effectiveness of the field winding of said generator, and means including a radiation responsive device, the energization of which is determined by the length of the slack-loop, for regulating the field varying means.

8. A control system comprising, in combination, means for delivering material, means for receiving said material, the relative position of said delivering and said receiving means being such as to provide a slack-loop in the material as it passes from the former to the latter, a generator having an armature and a field winding, a motor for driving the said delivering means and the said generator, a motor having an armature for driving the receiving means connected in closed circuit relation with the armature of said generator, and means including a radiation responsive device and a source of radiation for varying the excitation of the field winding of said generator, said radiation responsive device and said source of radiation being so disposed relative to the slack-loop as to decrease the excitation of said field winding when the amplitude of the slack-loop is less than a predetermined value and to maintain the said excitation substantially constant when the said amplitude exceeds said predetermined value.

9. A control system comprising, in combination, means for delivering material, means for receiving said material, the relative position of said delivering and said receiving means being such as to provide a slack-loop in the material as it passes from the former to the latter, a generator having an armature and a field winding, a motor for driving the said delivering means and the said generator, a motor having an armature for driving the receiving means, connected in closed circuit relation with the armature of said generator, a variable resistor connected in circuit with the field winding of said generator, a motor for actuating the said resistor, means including a radiation responsive device for controlling the operation of said motor, said device being responsive to the magnitude of said slack-loop.

10. A control system comprising, in combination, means for delivering material, means for receiving said material, means for causing the said material to have more than one direction of travel as it passes from the former to the latter, means for driving said receiving means and means including a photo-electric cell and an electric discharge device for regulating the speed of said driving means in accordance with the speed at which the said material is being delivered thereto, said photo-electric cell being responsive to a predetermined sag of said material.

11. A control system comprising, in combination, means for delivering material, rotating means for receiving the said material, the relative positions of said delivering and said rotating means being such that the material is free to sag as it passes from the former to the latter, means for driving said rotating means, and means including a photo-electric cell and an electric discharge device for gradually reducing the speed of the said driving means as the diameter of the rotating means increases, said photo-electric cell being responsive to the degree of sag.

12. A control system comprising, in combination, means for delivering material, means for receiving material, the relative positions of said delivering and said receiving means being such that the material is free to sag as it passes from the former to the latter, a generator having an armature and a field winding, a motor for driving the said delivering means and the said generator, a motor having an armature for driving the receiving means connected in closed circuit relation with the armature of said generator, and means including a photo-electric cell and an electric discharge device for varying the effectiveness of the field winding of said generator, said photoelectric cell being responsive to the sag of the material as it passes from the delivering means to the receiving means.

13. A control system comprising, in combination, means for delivering material, means for receiving said material, the relative position of said delivering and said receiving means being such as to provide a slack-loop in the material as it passes from the former to the latter, a generator having an armature and a field winding, a motor for driving the said delivering means and the said generator, a motor having an armature for driving the receiving means connected in closed circuit relation with the armature of said generator, means for varying the effectiveness of the field winding of said generator, and means including a photo-electric cell and an electric discharge device for regulating the field-varying means, said photo-electric cell being responsive to the magnitude of said slack-loop.

14. A control system comprising, in combination, means for delivering material, means for receiving said material, the relative position of said delivering and said receiving means being such as to provide a slack-loop in the material as it passes from the former to the latter, a generator having an armature and a field winding, a motor having an armature for driving the receiving means connected in closed circuit relation with the armature of said generator a variable resistor connected in circuit with the field winding of said generator, a motor for actuating the said resistors, and means including a photo-electric tube, and a grid glow tube for controlling the operation of said motor, said photo-electric tube being responsive to the magnitude of said slack-loop.

15. A control system comprising, in combination, means for delivering material, means for receiving said material, the relative position of said delivering and said receiving means being such as to provide a slack-loop in the material as it passes from the former to the latter, a generator having an armature and a field winding, a motor for driving the said delivering means and the said generator, a motor having an armature for driving the receiving means connected in closed circuit relation with the armature of said generator, means including a photo-electric tube, and an electric discharge device and a light source for varying the excitation of the field winding of said generator, said photo-electric cell and said light source being so disposed relative to the slack-loop as to decrease the excitation of said field winding when the amplitude of the slack-loop is less than a predetermined value and to maintain the said excitation substantially constant when the said amplitude exceeds said predetermined value.

16. A control system comprising, in combination, means for delivering material, means for receiving said material, the relative position of said delivering and said receiving means being such as to provide a slack-loop in the material as it passes from the former to the latter, a generator having an armature and a field winding, a motor having an armature for driving the receiving means, connected in closed circuit relation with the armature of said generator, a variable resistor connected in circuit with the field winding of said generator, a motor for actuating the said resistors, and means including a photo-electric tube for controlling the operation of said motor, said photoelectric tube being responsive to the magnitude of said slack-loop.

17. A control system comprising, in combination, means for delivering material, means for receiving said material, the relative positions of said delivering and said receiving means being such that the material is free to sag as it passes from the former to the latter, a motor having a field winding for driving said receiving means, a variable resistor connected in circuit with said field winding, an auxiliary motor for actuating the said resistor, and means including a plurality of radiation responsive devices and associated light sources for controlling the operation of said auxiliary motor, said radiation responsive devices being responsive to the sag of the material as it passes from the delivering means to the receiving means.

18. A control system comprising, in combination, means for delivering material, means for receiving said material, the relative positions of said delivering and said receiving means being such that the material is free to sag as it passes from the former to the latter, a motor having a field winding for driving said receiving means, a variable resistor connected in circuit with said field winding, an auxiliary motor for actuating the said resistor, means including a plurality of radiation responsive devices and associated radiation sources for controlling the operation of said auxiliary motor, the energization of said devices being controlled by the sag of the material as it passes from the delivering means to the receiving means, and means for controlling the operations of said auxiliary motor independently of said radiation responsive devices.

19. A control system comprising, in combination, means for delivering material, means for receiving said material, driving means for each of said two first mentioned means, the relative positions of said delivering means and receiving means being such that the material is free to sag as it passes from one to the other, a source of radiant energy, a radiation responsive device disposed to be influenced by said source of radiant energy by an amount determined by the length of said sag, and control means controlled by said radiation responsive device controlling said driving means for the material receiving means to maintain the sag in said material at a certain length.

ARNOLD S. RUFSVOLD.